United States Patent [19]

Shimmell

[11] Patent Number: 5,168,964
[45] Date of Patent: Dec. 8, 1992

[54] BRAKE CALIPER

[75] Inventor: Dennis S. Shimmell, Hudsonville, Mich.

[73] Assignee: Nelson Metal Products Corporation, Grandville, Mich.

[21] Appl. No.: 688,457

[22] Filed: Apr. 22, 1991

[51] Int. Cl.$^5$ .................... F16D 55/18; B22D 19/00
[52] U.S. Cl. .................... 188/72.4; 188/370; 164/98
[58] Field of Search .......... 188/71.1, 72.4, 361, 188/369, 370; 164/98, 91, 111, 112

[56] References Cited

U.S. PATENT DOCUMENTS

| | | | |
|---|---|---|---|
| 1,676,976 | 7/1928 | Anble et al. | 164/111 X |
| 2,095,055 | 10/1937 | Campbell et al. | 164/111 |
| 3,482,656 | 12/1969 | Shakespear | 188/73 |
| 3,556,265 | 1/1971 | Shakespear | 188/73 |
| 3,599,758 | 8/1971 | Bishop | 188/73.4 |
| 3,626,580 | 12/1971 | Shakespear . | |
| 3,789,961 | 2/1974 | Warwick | 188/370 |
| 4,003,422 | 1/1977 | Schramm et al. | 164/98 X |
| 4,023,613 | 5/1977 | Uebayasi et al. | 164/111 X |
| 4,306,639 | 12/1981 | Mitchell | 188/370 |
| 4,342,380 | 8/1982 | Melinat | 188/71.1 |
| 4,381,336 | 4/1983 | Ostwald | 188/370 X |
| 4,428,462 | 1/1984 | Warwick et al. | 188/72.4 |
| 4,509,619 | 4/1985 | Baynes et al. | 188/73.39 |
| 4,596,317 | 6/1986 | Nagai et al. | 188/72.4 |
| 4,700,444 | 10/1987 | Yamagata | 164/98 X |

FOREIGN PATENT DOCUMENTS

| | | | |
|---|---|---|---|
| 1282243 | 11/1968 | Fed. Rep. of Germany | 164/98 |
| 2087490 | 5/1982 | United Kingdom | 188/71.1 |

Primary Examiner—Robert J. Oberleitner
Assistant Examiner—Peter M. Poon
Attorney, Agent, or Firm—Warner, Norcross & Judd

[57] ABSTRACT

A brake caliper for a disk-type brake is disclosed having a prefabricated, cast-in-place cylinder bore liner. The liner is made of a machinable material, preferably steel, and the caliper body is made of a lightweight material, preferably aluminum. The caliper body is cast around the cylinder liner so that no further machining of the caliper bore is required. A reinforcing arm may be provided extending from the cylinder liner through the bridge portion of the caliper. A method for making the caliper is also disclosed in which the cylinder liner is positioned within a die cavity and molten metal material is cast around the liner to incorporate the liner into the caliper body.

19 Claims, 3 Drawing Sheets

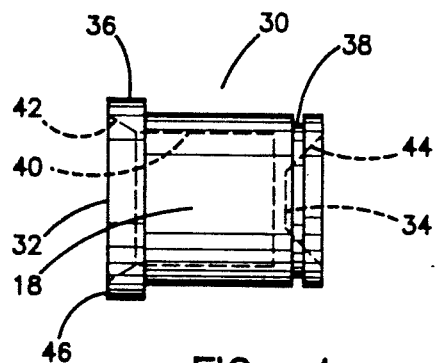
FIG. 4
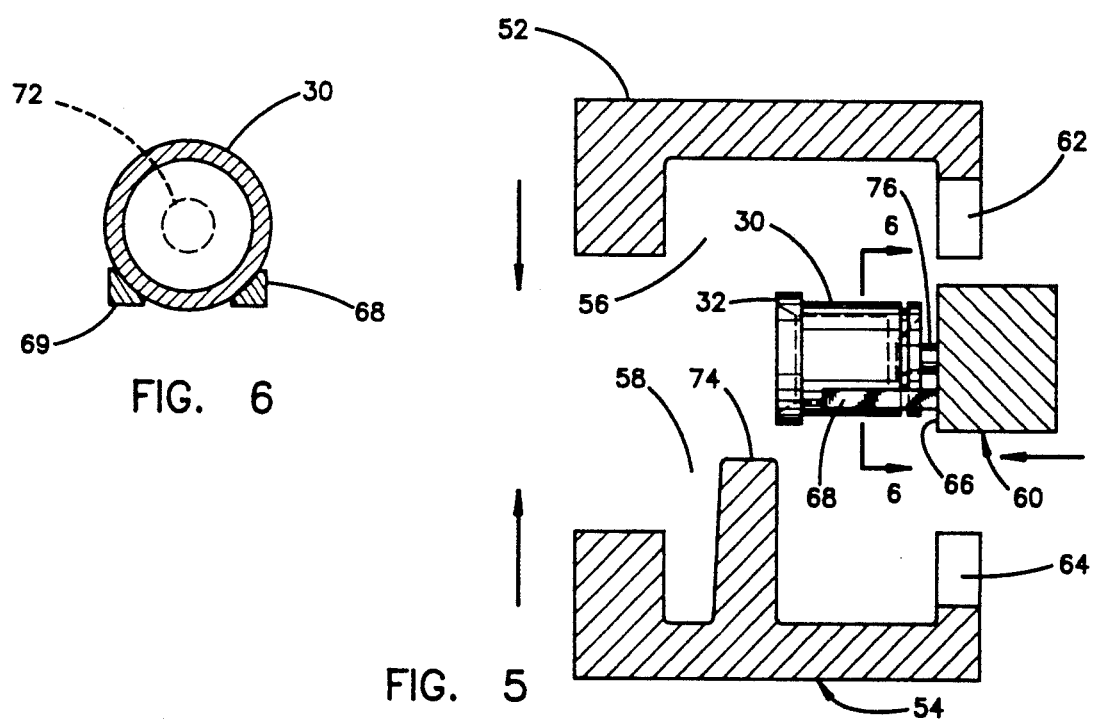
FIG. 6
FIG. 5
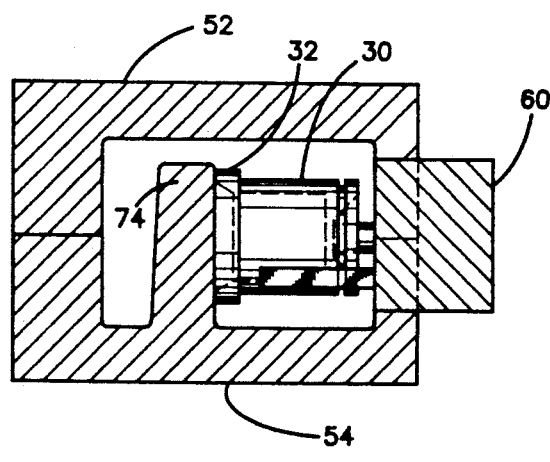
FIG. 7

BRAKE CALIPER

BACKGROUND OF THE INVENTION

1. Field of the Invention

The present invention relates to a caliper for a brake, and, more particularly, a brake caliper having a prefabricated, cast-in-place cylinder liner.

2. Description of the Related Art

Disk brakes are widely known and used in which a caliper straddles the rim of a disk which co-rotates with a wheel or shaft. Friction pads are disposed between the caliper and the disk on either side of the disk. One side of the caliper is provided with a hydraulic cylinder and a piston which causes the disk to be pinched between the pads, thus slowing or stopping rotation of the disk.

As shown in FIG. 1, brake calipers of the prior art have had a cylinder bore B formed by machining directly into the body of the caliper C. With this approach, since the bore is formed after the caliper body is cast, it is necessary to leave an opening O in the leg of the disk opposite the bore in order to provide clearance for machining tools. Therefore, the material used for the caliper must be machinable to the extent that a smooth surface is required for the bore B, and strong enough to bear the stresses imposed upon application of the brakes, even though a substantial portion of one leg of the caliper is absent.

To meet the aforementioned machinability and strength criteria, cast or molded brake calipers of the past have been made of iron or steel. These metals are quite heavy, and the weight they add to a vehicle exacts a penalty in fuel efficiency. While lighter metals are known, such as aluminum, such materials are either not adequately machinable, not sufficiently strong, or not economical.

Brake calipers are subject to concentrated bending stresses in the bridge portion connecting the two legs. To bear these stresses, it has been necessary to thicken the bridge portion, thus adding weight.

Furthermore, the machining of the cylinder bore into a fully formed caliper is made more difficult due to the weight and bulkiness of the caliper. Precise locating of the bore may also be more difficult.

Accordingly, there is an unmet need for a brake caliper which is lightweight and economically fabricated, yet which provides adequate strength and a readily machined bore.

SUMMARY OF THE INVENTION

The present invention satisfies the aforementioned needs by providing a cast or molded brake caliper in which the cylinder bore is provided as a prefabricated cylinder liner. The caliper may be made of lighter weight metal, such as aluminum. No machining of the cylinder is necessary after the caliper has been formed.

According to an embodiment of the invention, the cylinder liner is made of a suitable machinable material such as steel. The bore of the liner is machined before the liner is incorporated into the caliper. The finished liner is supported in proper position in a die or mold, then the caliper body is cast around the liner, thus incorporating the liner into the body. Since further machining of the cylinder is not necessary, the leg of the caliper opposite the cylinder need not have an access opening. Lightweight alloys may be used for the caliper body, such as 356 or 380 aluminum, thus significantly reducing the weight of the caliper.

According to an additional feature of the invention, a reinforcing arm may also be incorporated into the caliper extending across the bridge portion of the caliper body between the two caliper legs. The reinforcing arm is advantageously made of a strong metal, such as steel, to further enable the caliper to resist the stresses applied to the bridge when the brake is applied.

These and other objects, advantages, and features of the present invention will be more fully understood and appreciated by reference to the written specification and appended drawings.

BRIEF DESCRIPTION OF THE DRAWINGS

FIG. 4 is a side view of the cylinder liner;

FIG. 5 is a sectional view illustrating a first stage in the process of casting the brake caliper;

FIG. 6 is a sectional view taken substantially along the line 6—6 of FIG. 5;

FIG. 7 is a sectional view illustrating a second stage in the process of casting the brake caliper;

DESCRIPTION OF THE PREFERRED EMBODIMENT

Figure 2:
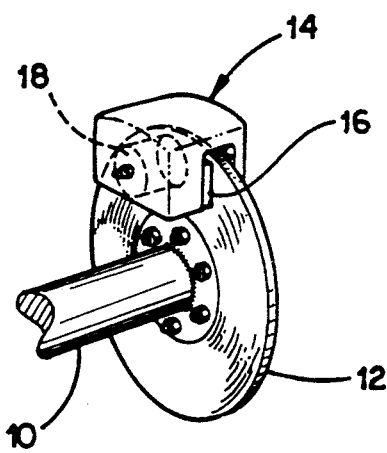
FIG. 2 is a fragmentary, diagrammatic, perspective view of a disk brake having a brake caliper according to the principles of the invention.

By way of disclosing a preferred embodiment of the invention, and not by way of limitation, there is shown in FIG. 2 a vehicle brake which includes in its general organization a rotatable axle or shaft 10, a disk 12 fixed to the shaft 10 for corotation therewith, and a brake caliper 14 held by suitable mountings (not shown) so as to straddle the outer annular portion of the disk. In a well known manner, friction pads 16 are mounted to the brake caliper disposed on either side of the disk 12. One leg of the caliper 14 includes a hydraulic cylinder bore 18 in which slides a piston (not shown). The caliper cylinder bore 18 is connected by suitable fluid conduits to a master cylinder such that actuation of the master cylinder causes the piston to be urged toward the disk 12, thus causing the disk to be frictionally grasped between the pads 16.

Figure 3:
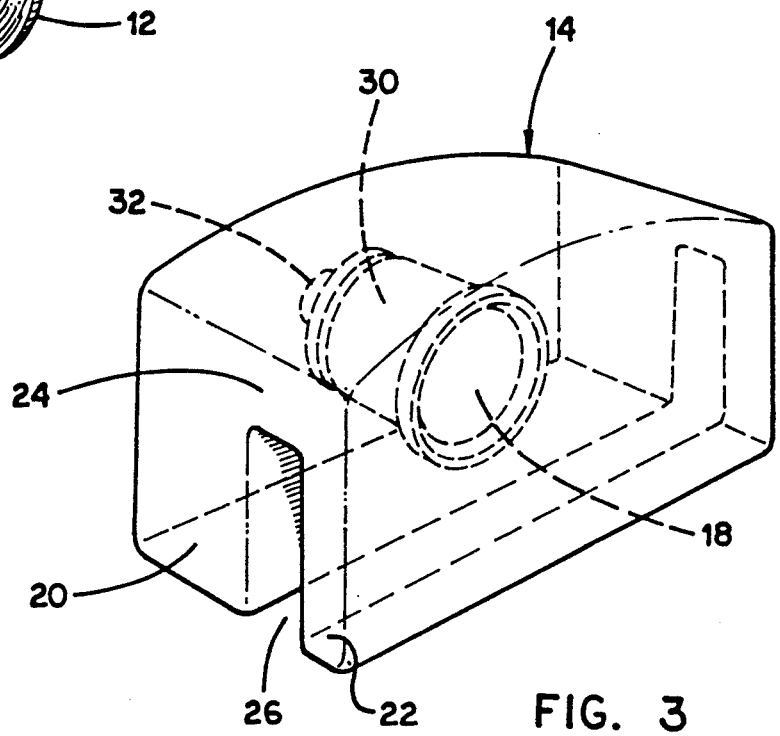
FIG. 3 is a perspective view of a brake caliper according to the principles of the invention.

Further details of the brake caliper 14 according to the invention are shown in FIG. 3. In this exemplary embodiment the caliper is formed as a unitary, relatively lightweight, diecast body of aluminum alloy. The body includes a first leg portion 20, a second leg portion 22 extending generally parallel to the first leg portion but spaced apart therefrom, and a bridge portion 24 which extends between and interconnects the outermost extents of the leg portions 20, 22. Thus, a recess 26 is formed between the first and second leg portions in which are installed the friction pads 16 (FIG. 2) and in which is received the outer annular portion of the disk 12.

The brake caliper illustrated in the figures is intended to be a generic representation of a typical caliper. It is to be understood that a wide variety of other forms and configurations may be employed within the scope of the present invention. The exact shape required for a particular installation will depend on factors well-known to those skilled in the art.

Figure 1:
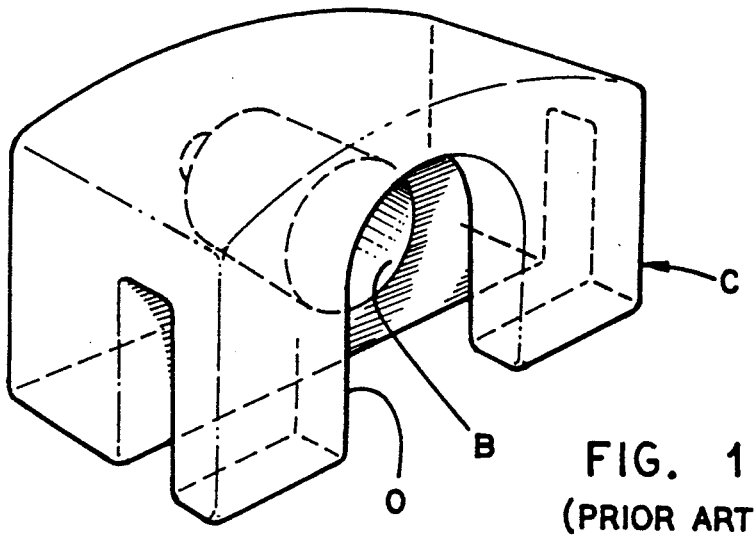
FIG. 1 is a perspective view of a brake caliper according to the prior art.

The bore 18 of the caliper 14 is lined by a cylinder liner 30. The bore opening of the cylinder liner is directed toward the second leg portion 22. When fully assembled, a piston will be placed in the bore 18 actuated by hydraulic fluid lines suitably connected through an opening 33 drilled into the rear of the caliper and liner. As described more fully below, the cylinder liner 30 is separately prefabricated prior to its incorporation into the brake caliper body. Since it is not necessary to drill or machine the cylinder bore 18 after the caliper is cast, the caliper leg portion 22 may be formed as an uninterrupted wall; i.e., there is no need for the opening 0 as in FIG. 1. Thus, a significant design constraint is obviated.

Details of the cylinder liner 30 are shown in FIG. 4. The liner 30 is generally cylindrical and hollow, having an open forward end 32 and a closed rear end 34. There is a circumferential flange 36 at the forward end and a circumferential groove 38 near the rear end. The interior 40 of the liner 30 is machined to the desired diameter and finish, thus forming the cylinder bore 18 which will receive the piston. The outermost extent 42 of the cylinder bore is flared to facilitate the installation of the piston. The rear portion of the liner is formed with a frusto-conical recess 44. The flange 36, groove 38, and recess 44 aid in the formation of a mechanical interlock between the liner and the caliper body. Preferably, the forward surface 46 of the liner is formed or machined so as to be flat and perpendicular to the axis of the liner. If desired, the junction between the outer tapered portion 42 with the cylindrical bore 18 may be formed with a shoulder to serve as a machine tool locator for precision machining of the bore. Preferably, the liner is made of steel.

The manufacture of the brake caliper by a die-cast process is illustrated in FIGS. 5-7. Upper and lower dies 52, 54 are formed with internal cavities 56, 58, respectively, which, when brought together, define the shape of the brake caliper to be cast. A third die part comprises a slide core 60 which slidingly fits in openings 62, 64 provided at the rear of the dies 52, 54. Extending from the front face 66 of the slide core are two fingers 68, 69 (FIG. 6). The fingers provide a cradle upon which the cylinder liner rests. Also extending from the front face 66 of the slide core is a central push rod 72. The outer end of the push rod 72 bears against the closed rear end of the liner.

When the dies are closed, as shown in FIG. 7, the slide core 60 is moved forward so that the forward end 32 of the liner 30 is pressed by the rod 72 tightly against an inner wall 74 of the lower die 54. Thus, the liner 30 is maintained in a correct position while molten alloy is introduced into the die cavity to form the caliper body. A bond and mechanical interlock is formed between the caliper body material and the liner such that the liner is firmly and permanently incorporated into the caliper body.

When the casting is complete and the material has cooled, the dies are open and the slide is withdrawn. The withdrawal of the push rod 72 leaves behind a recess 76 (FIG. 9) which is later extended through the rear wall of the liner 30 by drilling, and tapped for interconnection with a hydraulic fluid fitting. The withdrawal of the fingers 68, 69 leaves behind recesses 78, 80 (FIG. 9) which do not impair the function of the caliper.

Preferably, a temporary plug is placed in the cylinder opening to further prevent molten alloy from entering the cylinder bore during the casting process.

As will be apparent to those skilled in the art, a brake caliper according to the present invention may be manufactured by a variety of techniques such as die-casting, sand casting, or by a permanent mold. As used herein, terms such as "cast" or "casting" are intended to refer to all such techniques in which the caliper body is formable around the prefabricated cylinder liner.

Preferred materials for the caliper body include 380 aluminum alloy, 356 aluminum alloy, and 20 per cent silicon carbide aluminum composite material such as is available under the designation ALCAN.

Figure 8:
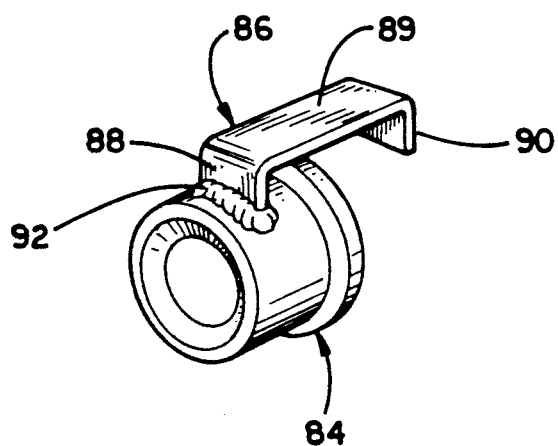
FIG. 8 is a perspective view showing an alternate embodiment of the cylinder liner including a reinforcing arm.
Figure 9:
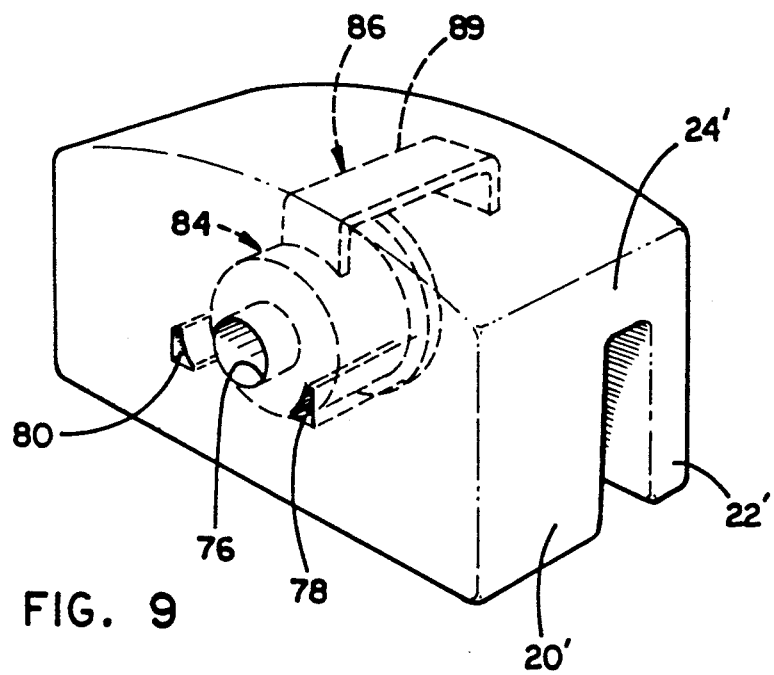
FIG. 9 is a perspective view of a brake caliper incorporating the cylinder liner of FIG. 7.
Figure 10:
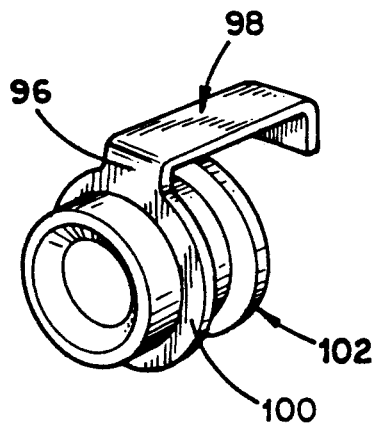
FIG. 10 is a perspective view of a second alternate embodiment of the cylinder liner.

FIGS. 8-10 illustrate alternate embodiments of the invention in which a caliper bridge reinforcing arm is included. When braking force is applied by a caliper brake, a bending moment is induced in the portion of the caliper body bridging the caliper leg portions. As shown in FIG. 8, a cylinder liner 84, formed similarly to the cylinder liner 30 may be provided with a generally U-shaped reinforcing arm 86 having a first flange 88 extending upward from a central portion of the liner 84, a web 89 extending forwardly from the first flange 88, and a second flange 90 extending downwardly from the forward extent of the web 89. The first flange 88 is fixed to the liner 84 by a weldment 92.

The cylinder liner 84 and the affixed reinforcing arm 86 are incorporated into a brake caliper in the same manner as described above with respect to FIGS. 5-7. As shown in FIG. 9, in the finished caliper the web 89 of the reinforcing arm 86 extends across the bridge portion 24' of the caliper from the first leg portion 20' to the second 22'. The reinforcing arm is preferably formed of a strong metal, such as steel, to provide adequate resistance to the forces imposed on the caliper.

In the embodiment of FIG. 10, the first flange 96 of reinforcing arm 98 is formed with a ring 100. The cylinder liner 102 is inserted through the ring 100 fitting tightly therein. Other suitable means for affixing the arm to the liner may be employed, such as by forming both as a unitary element.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A brake caliper comprising:
   a unitary, cast caliper body including first and second spaced-apart leg portions, and a bridge portion interconnecting said leg portions forming a recess therebetween; and
   a prefabricated, cast-in-place cylinder liner disposed in said first leg portion forming a piston recess directed toward said second leg portion;
   said second leg portion being uniterrupted and obstructing access to said piston recess through said second leg portion.

2. The brake caliper of claim 1 wherein said caliper body comprises a relatively lighter material and said cylinder liner comprises a relatively heavier material.

3. The brake caliper of claim 2 wherein said caliper body comprises aluminum.

4. The brake caliper of claim 2 wherein said cylinder liner comprises steel.

5. The brake caliper of claim 1 wherein said cylinder liner includes means for forming an interlock with said caliper body.

6. The brake caliper of claim 5 wherein said means for forming an interlock comprises a circumferential groove.

7. The brake caliper of claim 1 further comprising a reinforcing arm mean-s affixed to said cylinder liner and disposed in said bridge portion.

8. The brake caliper of claim 7 wherein said reinforcing arm means comprises a member including a first flange affixed to said cylinder liner disposed adjacent said first leg portion, a web extending from said first flange through said bridge portion, and a second flange disposed adjacent said second leg portion.

9. The brake caliper of claim 7 wherein said reinforcing arm means comprises steel.

10. A lightweight brake caliper comprising:
a unitary, cast caliper body of lightweight metal material including a first leg portion, a second leg portion spaced apart from said first leg portion, a bridge portion interconnecting said first and second leg portions, thereby forming a recess between said first and second leg portions for the receipt of an outer annular portion of a brake disk; and
a cast-in-place cylinder liner of machinable metal material disposed in said caliper body first leg portion, said cylinder liner being prefabricated with a cylinder bore directed toward said recess for the receipt of a hydraulic piston therein;
said second leg portion being uninterrupted and obstructing access to said piston recess through said second leg portion.

11. The brake caliper of claim 10 wherein said lightweight metal material comprises an aluminum alloy.

12. The brake caliper of claim 10 wherein said lightweight metal material comprises a composite of aluminum and silicon carbide.

13. The brake caliper of claim 10 wherein said cylinder liner comprises a generally cylindrical member having an open first end disposed adjacent said recess and a closed end disposed opposite said open end.

14. The brake caliper of claim 13 further comprising a circumferential groove formed about the exterior of said cylinder liner for providing a mechanical interlock between said cylinder liner and said brake caliper body.

15. The brake caliper of claim 13 further comprising a circumferential flange about said first end of said cylinder liner.

16. The brake caliper of claim 10 wherein said machinable metal comprises steel.

17. The brake caliper of claim 10 further comprising means for reinforcing said bridge portion.

18. The brake caliper of claim 17 wherein said means for reinforcing comprises an arm member affixed to said cylinder liner and extending through said caliper bridge portion.

19. A brake caliper comprising:
a unitary, cast caliper body including first and second spaced-apart leg portions, a bridge portion interconnecting said leg portions and forming a recess therebetween; and
a cylinder liner disposed in said first leg portion forming a piston recess directed toward said second leg portion;
said second leg portion being uninterrupted and obstructing access to said piston recess through said second leg portion.

* * * * *

UNITED STATES PATENT AND TRADEMARK OFFICE
CERTIFICATE OF CORRECTION

PATENT NO. : 5,168,964

DATED : December 8, 1992

INVENTOR(S) : Dennis S. Shimmell

It is certified that error appears in the above-identified patent and that said Letters Patent is hereby corrected as shown below:

```
Column 4, Line 61;
  after "portions" insert --and--.

Column 5, Line 16;
  "mean-s" should be --means--.
```

Signed and Sealed this

Twenty-sixth Day of October, 1993

Attest:

BRUCE LEHMAN

*Attesting Officer*　　　*Commissioner of Patents and Trademarks*